United States Patent [19]

Thompson

[11] Patent Number: 5,121,770
[45] Date of Patent: Jun. 16, 1992

[54] HYDRAULICALLY CONTROLLED VALVE FOR A COOL TOWER AND THE LIKE

[75] Inventor: Tommy L. Thompson, Tucson, Ariz.

[73] Assignee: Planetary Design Corporation, Tucson, Ariz.

[21] Appl. No.: 505,784

[22] Filed: Apr. 6, 1990

[51] Int. Cl.⁵ .............. B01F 3/04; F16K 31/18; F16K 33/00
[52] U.S. Cl. .................. 137/312; 62/171; 137/391; 137/409; 137/434; 261/97; 261/106; 261/DIG. 46
[58] Field of Search .......... 62/171, 305; 137/391, 137/397, 398, 409, 434, 312, 395, 396; 261/97, 106, DIG. 46

[56] References Cited

U.S. PATENT DOCUMENTS

| | | | |
|---|---|---|---|
| 1,950,345 | 3/1934 | Williams | 261/DIG. 46 |
| 2,828,761 | 4/1958 | Weibert, Jr. | 261/97 UX |
| 2,856,166 | 10/1958 | Goettl | 261/97 |
| 2,910,279 | 10/1959 | Wood | 261/DIG. 46 |
| 3,157,716 | 11/1964 | Morris | 261/97 |
| 3,188,061 | 6/1965 | Alguire | 137/397 |
| 3,640,265 | 2/1972 | Swart, Sr. | 261/DIG. 46 |
| 4,031,180 | 6/1977 | Bohanon | 261/106 |
| 4,361,522 | 11/1982 | Goettl | 261/DIG. 46 |
| 4,389,352 | 6/1983 | Bohanon, Sr. | 261/106 |
| 4,968,457 | 11/1990 | Welch | 261/DIG. 46 |

Primary Examiner—George L. Walton
Attorney, Agent, or Firm—Mark E. Ogram

[57] ABSTRACT

A valve operating on hydraulic pressure for the control of water being deposited onto evaporative pads located on a cool tower. The valve utilizes water flow to fill a basin or tank which is slowly being drained. When the tank is empty, a valve is opened that releases water to the evaporative cooling pads and also to the tank; when the tank is filled, the valve closes permitting the tank to slowly drain and repeat the cycle.

8 Claims, 2 Drawing Sheets

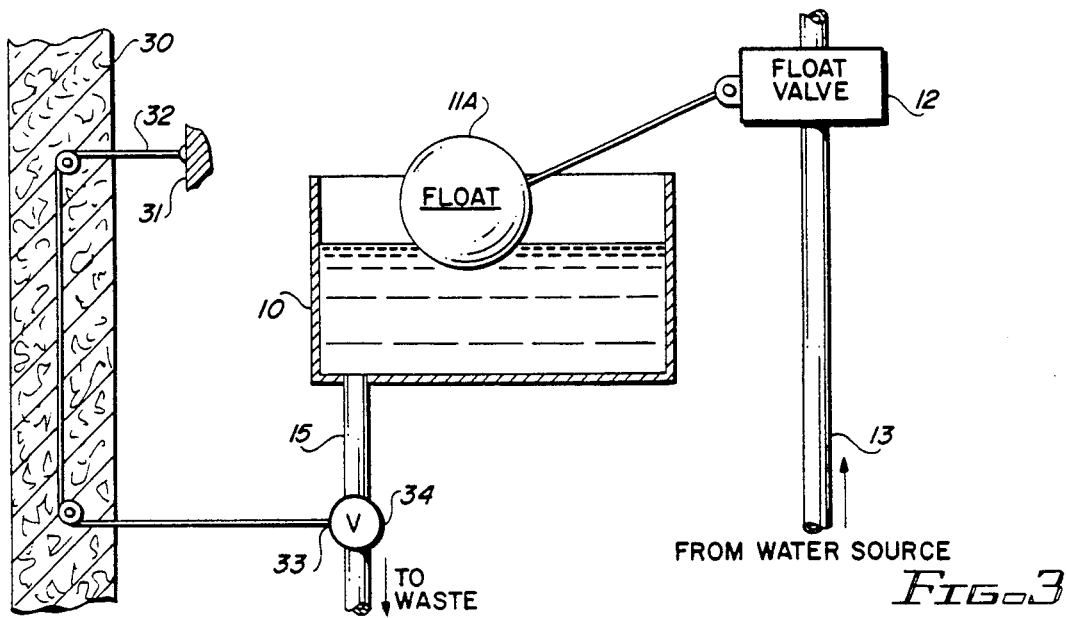
FIG-3
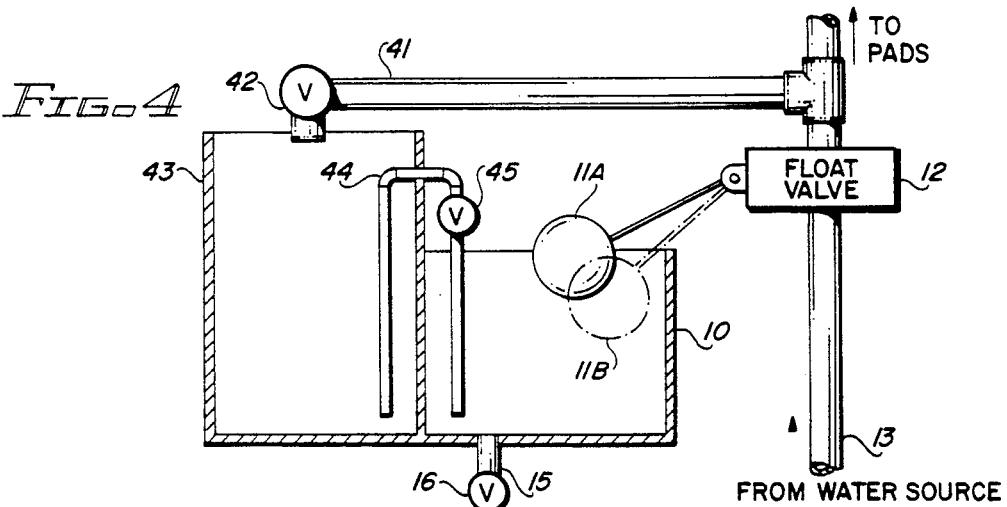
FIG-4
FIG-5

HYDRAULICALLY CONTROLLED VALVE FOR A COOL TOWER AND THE LIKE

BACKGROUND OF THE INVENTION

This invention relates generally to valves and specifically to a design of valves used for evaporative cooling applications.

Evaporative cooling techniques in one form or another have been used for centuries. The concept is to pass a stream of hot relatively dry air over a surface of water (usually established by moistened pads) permitting the water to evaporate and consume energy from the hot dry air; thereby cooling the air.

Systems used to wet pads in existing evaporative coolers include: a recirculating pump arrangement; once-through flow systems; and a solenoid valve-timer combination (non-recirculating system).

A recirculating system is the most common approach and is used in most evaporative ("swamp") coolers which employ blowers to move the air. Through the use of a pump, water is dumped over a cooler's pads to trickle down. Any excess water is caught in a basin. The pump recirculates this excess together with fresh water from a pressurized line over the pads.

In some applications, the electrical supply required by this approach's pumps and blowers is not available or is economically prohibitive, making this device infeasible.

In all systems, some excess of water above that which evaporates is always required to prevent scaling or salt build-up; this excess is called "blowdown", and is discharged to waste or used for plant irrigation.

Perhaps the oldest and most wasteful of the water depositing systems is a once-through system which either pumps or discharges water continuously from a pressurized line over the pads. This "once-through" system is quite wasteful of water. If the water flow is reduced to a point where it barely exceeds evaporation, "channeling" occurs, with uneven wetting of the pads, dry spots, loss of efficiency, and salt build-up.

As can be quickly appreciated, this approach is extremely wasteful of water since a constant flow is required that is relatively unregulated and totally ignorant of the changing environmental conditions..

The third approach which has been used is where an intermittent flow of water to the pads is used. The flow of water is cut on and off periodically using a timer-solenoid valve combination. With this system, specialized pads must be used which are readily wetted which retain water well. Some such pads include: Cel-Dek which is commercially available from Munters Corp., Fort Myers, Fla.; or Glacier-Cor from Eng-Cor Inc, La Mirada, Calif.

In this application, the water must flow over the pads at a substantial rate during the "on" portion of the cycle to assure complete wetting and flushing of air borne dust or debris. The ratio of time off to time on is approximately 20:1 or 25:1.

Again, because a solenoid is used, this approach of a timer-solenoid valve requires the availability of electricity.

It is clear from the foregoing that an electricity independent system does not exist for evaporative cooling applications.

SUMMARY OF THE INVENTION

The invention consists of a tower equipped with evaporative cooler pads near the top. These pads are wetted either periodically or as they become dry with water from a pressurized line. All power required for the tower operation and valve timing is provided from the hydraulic pressure in the water line. The wet pads evaporatively cool the ambient air, which becomes cooler and heavier. The air flows, either by existing wind pressure or solely by gravity through the interior of the tower and out the bottom. This cooled air flow is usable for cooling and ventilating structures.

The key to the invention is the control of water flow to the pads without the use of electrical power. Several variations of the invention exist.

In the preferred embodiment of the invention, the rate of recharging the cooling pads is controlled by water flow through an orifice.

This embodiment of the invention has the same objective as the electric solenoid valve-timer system of the prior art: wet the evaporative cooling pads through a burst of water.

In the present invention a float valve or ballcock in a small tank or reservoir with a variable orifice outlet is used. The float valve controls water flow to the pad distribution system and to the tank containing the float. As the orifice permits the tank to drain, the float valve reaches a point where the float valve opens the line which both charges the evaporative cooling pads and refills the tank. Once the tank is filled, the float valve closes the line to the pads and the cycle repeats.

The rate of flow into the tank controls the length of time water flows over the pads. The rate of flow through the outlet orifice controls the time the flow is turned off. Both critical timing considerations are controlled.

In this embodiment, excess water from the pads is collected in small pans under the pads, and discharged by gravity either to waste or used for plant irrigation.

In one embodiment of the invention, the float and tank are placed under the pads and the line refilling the tank is eliminated. The tank is refilled with the water flow from the pads. This thereby controls the time water flows over the pads.

Still another variation of the invention uses an element of water sensitive material mounted in the pads. This water sensitive material changes its physical dimensions when wet. The dimensional changes are used to control water flow over the pads.

Examples of these water sensitive materials include: keratin containing material such as hair, horn, and animal membrane; some types of wood and paper, or more likely, synthetics such as nylon or dacron. These materials usually expand or stretch when wetted. Those of ordinary skill in the art readily recognize other materials which serve the same function.

Most of these materials are unable to provide sufficient force to directly operate the flow valve to the pad distribution system, but can readily open or close the line used to drain the tank and thereby lengthens or shortens the time between the wetting of the pads.

As example, an element of nylon, mounted in the pad shrinks as the pads dry during use. This shrinking opens a valve in the drain line allowing the tank to drain more rapidly and thereby react to the specifics of the cooling mechanism and the environment.

An alternative to this embodiment is where the difference in temperature between wet and dry surfaces is used to control water flow to the evaporative pads. When the pads are wet, they are cooled to a temperature approaching the wet-bulb air temperature by the air flowing through them. A material with a large coefficient of thermal expansion is either: (i) located in the pads, or, (ii) covered with the material the pads are made of and located outside the pads, but in the airstream and wetted at the same time as the pads.

A second element of the same material, exterior to the pads but also in the airstream, is covered by a material with a greater capacity for water than the pad material. Examples of such material include heavy wick, or thin sponge. (Alternatively, the second element is wetted frequently by dripping water at a low rate from the float tank or a water line, so that the element is always wet.) Expansion of the pad element as it dries, because of the temperature increase, relative to the wet element, operates a valve to start water flow over the pads.

Another embodiment of the invention recognizes the fact that most ballcocks are not particularly accurate for turning water on and off at different fixed levels. While a commercially available valve assembly could be modified to operate as described earlier. This embodiment creates a structure that minimizes the accuracy requirements of the ballcock.

In this embodiment, an additional tank with a syphon line and adjustable valve is required; but the need for sensitive and accurate ballcock is all but eliminated.

The invention together with various embodiments thereof will be more fully described by the following drawings and their accompanying descriptions.

DRAWINGS IN BRIEF

FIG. 3 is a functional diagram of another embodiment of the valve of the invention.

FIG. 4 is a functional diagram of an embodiment of the invention wherein compensation for inaccurate ballcocks is made.

FIG. 5 is a functional diagram illustrating the use of a difference in temperature to control the valve.

DRAWINGS IN DETAIL

Figure 1:
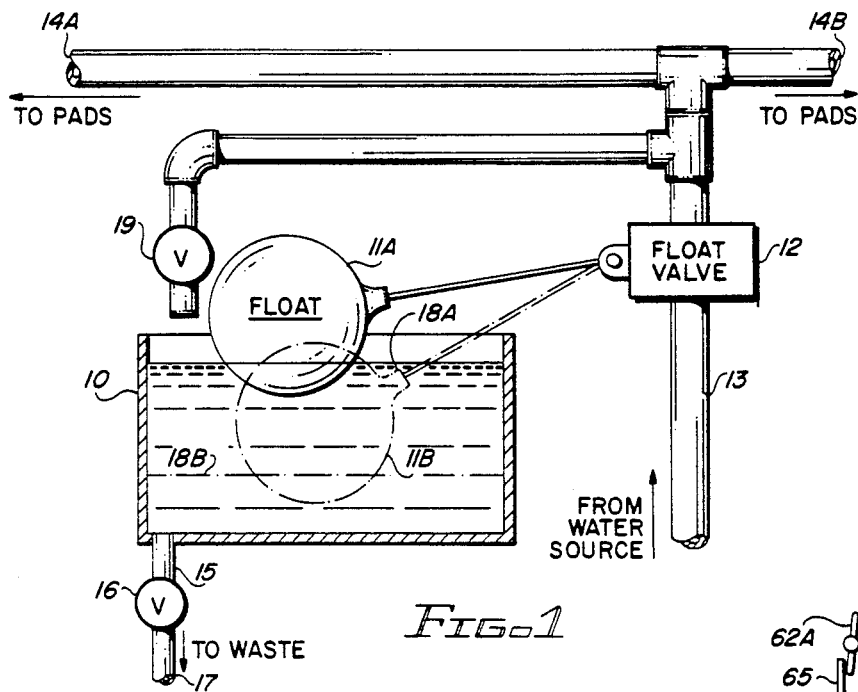
FIG. 1 is a functional diagram of the preferred embodiment of the invention.

FIG. 1 is a functional diagram of the preferred embodiment of the invention.

In this embodiment, a common float 11A and float valve 12 are used in a small tank 10 having an outlet orifice 15. The flow of water from tank 10 through outlet orifice 15 is controlled via valve 16. Water through valve 16 is discharged as waste 17.

Float valve 12 is used to control the flow of water over the evaporative cooler pads 14A and 14B (not shown). Float valve 12 also controls water flow to tank 10 containing float 11A.

Beginning the description with the valve closed and the float 11A at its highest position as controlled by water level 18A in tank 10, valve 16 is adjusted for the water to drain slowly from tank 10. The rate at which the water drains and the volume of the tank largely controls the cycle duration of the assembly.

When the water level drops to 18B, a point determined by the float valve assembly (11A and 12) and installation, valve 12 opens, allowing water from water source 13 to: (i) flow to the pads 14A and 14B through the main line; and, (ii) a much smaller amount of water to flow through a second line, through adjustable valve 19 and into tank 10, thereby raising the water level eventually to level 18A.

When tank 10 fills, float valve 12, responding to float 11A, stops flow to the pads and into tank 10, and the operating cycle is completed. The tanks continues to drain and the cycle naturally repeats.

Note that the rate of flow through adjustable valve 19 into tank 10 controls the length of time water flows over the pads. The rate of flow through orifice 15 and valve 16 controls the time the water flow is turned off.

Depending on the location of the tank (i.e. higher than pads 14A and 14B), waste water 17 through outlet orifice 15 is directed over the pads which thereby minimizes waste.

Preferably, excess water from the pads (not shown) is collected in small pans under pads 14A and 14B, and discharged by gravity either to waste or used for plant irrigation.

Figure 2:
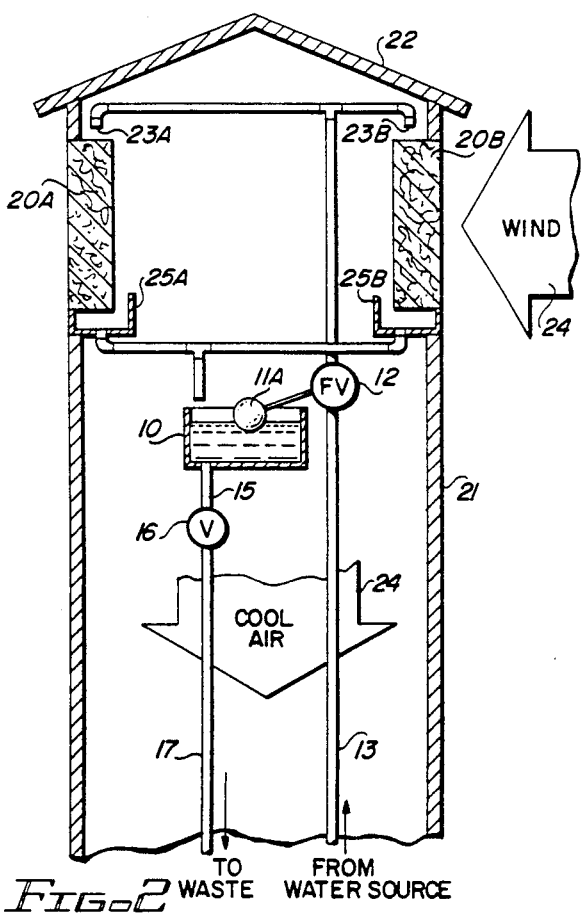
FIG. 2 is a functional diagram of an embodiment of a cooling tower and illustrates an embodiment of the invention that eliminates the need for a line to fill the tank as described in FIG. 1.

FIG. 2 is a functional diagram of an embodiment of a cooling tower and illustrates an embodiment of the invention that eliminates the need for a line to fill the tank as described in FIG. 1.

In this embodiment, float 11A and tank 10 are placed lower than pads 20A and 20B. Water flow from the pads is collected in pans 25A and 25B and directed to tank 10. As the water through pads 25A and 25B fills tank 10, the flow of water through valve 12 and outputs 23A and 23B stops; hence less water is subsequently drained into tank 10. As this occurs, the water being drained via outlet orifice 15 and adjustable valve 16, exceeds the incoming water flow to tank 10, resulting in a lowering of the water level. At a chosen point, float 11A and valve 12 open the water line to replenish pads 20A and 20B which eventually refills tank 10.

Since the pads are kept wet, ambient air flow such as indicated by arrow 24, flows through pads 20A and 20B. Through evaporative cooling this air becomes cooler and heavier. This cooled air falls through the hollow interior of tower 21 with roof 22 creating a cool air flow 24 which can be used to cool or ventilate a building or outside pavilion.

Although this discussion indicates the use of an alternative embodiment of the hydraulically timed valve for the cool tower, any of the other embodiments as discussed herein, including that described in FIG. 1, is equally suited.

FIG. 3 is a cutaway view of another embodiment of the valve of the invention.

This embodiment of the invention involves the use of an element of material mounted in the pads which changes its physical dimensions when wet. The dimensional changes are used to control water flow over the pads.

The same general arrangement of tank 10, float 11A, valve 12, and water source 13 is used in this embodiment of the invention as was discussed relative to FIGS. 1 and 2. In this embodiment through, a length of material 32 extends from a fixed point 31 and into pad 30; through a portion of pad 30, exiting and connecting to adjustable valve 34 at point 33.

When pad 30 is wet, material 32 is also wet and expands in response to the moisture. As the water within pad 30 is evaporated, material 32 constricts and and expands the opening of valve 34 more to encourage tank 10 to drain faster; thereby decreasing the "normal" cycle time in response to the moisture content of pad 30.

Those of ordinary skill in the art readily recognize various valves and attachments techniques which will serve the function of material 32 and valve 34.

This embodiment of the invention creates a valve assembly that is not only hydraulically timed but also responsive to the moisture level of the pads. The arrangement and use of material 32 is equally applicable to the valve assemblies of FIGS. 1 and 2 and described later.

Water sensitive materials which could be used for material 32 include: keratin containing material such as hair, horn, and animal membrane; some types of wood and paper, or more likely, synthetics such as nylon or dacron and other materials obvious to those of ordinary skill in the art. These materials usually expand or stretch when wetted.

In another embodiment, not shown, material 32 is used to directly open float valve 12.

Material 32 provides a control element for the valve assembly.

FIG. 4 is a functional diagram of an embodiment of the invention wherein compensation for inaccurate ballcocks is made.

Most ballcocks are not particularly accurate for turning water on and off at different fixed levels. This embodiment provides for the use of an inexpensive ballcock with limited travel of the float between on and off positions.

An additional tank 43 with a syphon line 44 and adjustable valve 45 is positioned to work in conjunction with tank 10, outlet orifice 15, valve 16, a float 11A, and valve 12 as described before.

Beginning with the ballcock closed, the float in its uppermost position 11A, and both tanks full, the water drains from tank 10 through the outlet orifice 15. At the same time, water is flowing from tank 43 into tank 10 through syphon line 44.

An overflow line (not shown) from tank 10 is used to reduce the need for accurately matching the flow rates through and adjustable valve 45 and outlet orifice 15 with valve 16. Tank 10 remains full and valve 12 closed until the water levels of tanks 10 and 43 are roughly the same. Then the water level starts to drop in both tank. The syphon flow continues between tanks 10 and 43 until the level is reduced in tank 43 to a point where the syphon is broken (float at 11B) and valve 12 opens, permitting water flow to the pads, and into tank 43 through valve 42 via line 41.

Tank 43 fills while the pads are being wetted. When the water level of tank 43 reaches the top of the syphon line 44, flow therethrough automatically begins into and fills tank 10. When tank 10 is full, valve 12 closes, water flow to the pads and tank 43 is terminated, and the cycle is repeated.

The length of time that water is flushed over the pads is controlled by the combined volume of the two tanks 43 and 10, the setting of valve 42, and to much lesser extent, by the setting of valve 45 and outlet orifice 15. The length of time that water flow over the pads is turned off is controlled by the volume of tanks 10 and 43 and the outlet orifice size 15 (with valve 16.) The flow through valve 45 is adjusted to slightly exceed the flow through outlet orifices 15 and valve 16.

FIG. 5 is a functional diagram illustrating the use of difference in temperature to control the valve.

As with the other embodiments, this assemblage utilizes the same basic components of tank 10, float 11A, valve 12, and water source 13.

This embodiment capitalizes upon the difference in temperature between wet and dry surfaces. When the pads are wet, they are cooled to a temperature approaching the wet-bulb air temperature by the air flowing through them.

A first element 50, with a large coefficient of thermal expansion, is attached to a fixed point 51 and extends thorugh pad 30 to attach to valve 52 at point 53. A second element 56, of the same material as first element 50, is attached to point 57 and is exterior to pads 30 but also in the airstream. This second element 59 is covered by material 55 with a greater capacity for water than the pad material. Material 55 is a material such as a heavy wick, thin sponge or other such material obvious to those of ordinary skill in the art.

Second element 56 is attached to valve 52. Second element 56 is kept constantly moist by water spray 59 controlled by valve 58. Alternatively, second element 56 is wetted frequently by dripping water at a low rate from the tank 10 so that the element is always wet.

An alternative arrangement (not shown) for first element 50 is where first element 50 is not located in the pads, but is covered with the material the pads are made of and located outside the pads in the airstream and wetted at the same time as the pads.

Figure 6A:
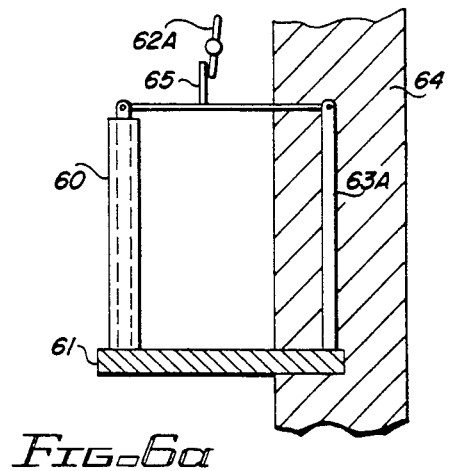
FIGS. 6a and 6b illustrate an alternative embodiment of the valve utilizing a difference in temperature for its control element.
Figure 6B:
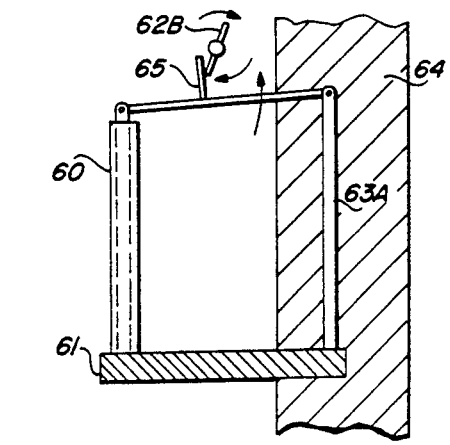

FIGS. 6a and 6b illustrate an alternative embodiment of the valve utilizing a difference in temperature for its control element.

FIG. 6a illustrates the situation where pad 64 has sufficient water to close the valve, as indicated by position 62A. Bar 63A is in contact with pad 64 and is cooled by the evaporation cooling therein. Reference bar 60 is placed outside of pad 64 and is kept constantly wet by its own floc and water supply (not shown). Both bar 63A and reference bar 60 are fastened to a rigid platform 61.

The water valve, when in position 62A, is in the "off" position as dictated by finger 65 so no water is being added to pad 64. Pad 64 therefore will slowly dry through evaporation and pad 64 will loose its ability to cool rod 63A.

This result is illustrated in FIG. 6b showing that rod 63B has expanded due to the increased heat forcing finger 65 away from the water valve, as indicated in 62B; thereby opening the water valve. Those of ordinary skill in the art readily recognize various valves which will work in this environment and various materials which will function as rod 63A, 63B, and reference rod 60.

As the water evaporates from pad 64, rod 63B cools and shrinks, returning to the state indicated in FIG. 6a.

It is clear from the foregoing that the present invention creates valve and cooling system which is independent of electrical energy and which provides for improved operation.

what is claimed is:

1. A hydraulically timed water system for an evaporative cooler comprising:

a) a pressurized water line;

b) a primary tank being in a fixed position relative to said pressurized water line and having a drain orifice therein:

c) a float valve having a float sensor and a valve responsive thereto. said valve controlling water flow in said pressurized water line, said float sensor located in said primary tank and wherein said float sensor opens said valve when said float sensor reaches a predetermined water level, said drain orifice permitting continuous draining of said primary tank irregardless of the position of said float sensor within said primary tank, such draining defining a cycle time that detemines the opening of said float valve; and, d) means for filling said primary tank when said float valve is open.

2. The hydraulically timed water system according to claim 1 further including a drain valve communicating with said drain orifice in said primary tank.

3. The hydraulically timed water system according to claim 2 further including means for adjusting said drain valve in response to a moisture level 2 said evaporative cooler.

4. The hydraulically timed water system according to claim 3 wherein said means filling said tank include means for trapping excess water from a selected material.

5. A cooling tower comprising:

a) a tower having a hollow core and at least one opening at a top poriton thereof and at least one opening at a bottom portion;

b) evaporative pads located over said at least one opening at a top portion of said tower:

c) a pressurized water line: and.

d) a hydraulically timed water valve system having.
  p2 1) a primary tank being in a fixed position relative to said pressurized water line and having a drain orifice therein. said primary tank constantly receiving water from said evaporative pads 2) a float valve having a float sensor and a valve responsive thereto, said valve controlling water flow in said pressureized water line to said evaporation pads, said float sensor located in said primary tank and wherein said float sensor opens said valve when said float sensor reaches a predetermined water level, said drain orifice permitting continuous draining of said primary tank irregardless of the position of said float sensor within said primary tank. such draining defining a cycle time that determines the opening of said float valve, and, 3) means for filling said primary tank when said float valve is open.

6. The cooling tower according to claim 5 further including a drain valve communicating with said drain orifice in said primary tank.

7. The cooling tower according to claim 6 including means for adjusting said drain valve in response to a moisture level of the evaporative pads.

8. The cooling tower according to claim 7 wherein said means for filling said tank include means for trapping excess water from said evaporation pads.

* * * * *